United States Patent [19]

Colombo

[11] Patent Number: 5,624,567
[45] Date of Patent: Apr. 29, 1997

[54] PROCESS FOR REMOVING IODINE/IODIDE FROM AQUEOUS SOLUTIONS

[75] Inventor: Gerald V. Colombo, Myrtle Creek, Oreg.

[73] Assignee: Umpqua Research Company, Myrtle Creek, Oreg.

[21] Appl. No.: 599,798

[22] Filed: Feb. 12, 1996

[51] Int. Cl.$^6$ ............................................. C02F 1/42
[52] U.S. Cl. .............................. 210/662; 210/683
[58] Field of Search ........................... 210/683, 662

[56] References Cited

U.S. PATENT DOCUMENTS

| | | | |
|---|---|---|---|
| 2,157,508 | 5/1939 | Urbain et al. | 23/217 |
| 2,261,021 | 10/1941 | Findlay | 23/87 |
| 2,614,099 | 10/1952 | Bauman et al. | 260/83.1 |
| 2,945,746 | 7/1960 | Shaw | 23/216 |
| 3,050,369 | 8/1962 | Mills | 23/216 |
| 3,177,050 | 4/1965 | Houy | 23/216 |
| 3,352,641 | 11/1967 | Nakamura | 23/216 |
| 3,767,776 | 10/1973 | Bradford | 423/475 |
| 3,923,665 | 12/1975 | Lambert et al. | 210/501 |
| 3,943,229 | 3/1976 | Keener et al. | 423/240 |
| 4,131,645 | 12/1978 | Keblys et al. | 423/501 |
| 4,238,477 | 12/1980 | Lambert et al. | 210/501 |
| 4,451,375 | 5/1984 | Grinstead | 210/670 |
| 4,479,877 | 10/1984 | Guter | 210/670 |
| 4,615,806 | 10/1986 | Hilton | 210/690 |
| 4,999,190 | 3/1991 | Fina et al. | 424/79 |
| 5,176,836 | 1/1993 | Sauer et al. | 210/670 |
| 5,350,523 | 9/1994 | Tomoi et al. | 210/683 |
| 5,356,611 | 10/1994 | Herkelmann et al. | 423/501 |
| 5,366,636 | 11/1994 | Marchin et al. | 210/665 |
| 5,367,031 | 11/1994 | Marchin et al. | 525/328.3 |
| 5,464,603 | 11/1995 | Marchin et al. | 423/501 |

*Primary Examiner*—Cynthia L. Nessler
*Attorney, Agent, or Firm*—Marger Johnson McCollom & Stolowitz, P.C.

[57] ABSTRACT

The present process is designed for removing elemental iodine and iodide ions from an aqueous solution containing iodine and iodide ions. This process employees a strong-base anion exchange resin. The resin comprises trialkyl amine groups each preferably comprising from alkyl groups containing 3 to 8 carbon atoms. The aqueous solution containing elemental iodine and iodide ions is passed through the resin and thereby treats the aqueous solution by removing elemental iodine and iodide ions therefrom. The volume of the aqueous solution passing through the resin until reaching the Breakthrough Point is at least about 8 liters per cubic centimeter.

18 Claims, No Drawings

PROCESS FOR REMOVING IODINE/IODIDE FROM AQUEOUS SOLUTIONS

BACKGROUND OF THE INVENTION

This invention is directed to a process for removing iodine and iodide from an aqueous feed stream, and more particularly, to a process for more effectively and efficiently removing iodine and iodide from an aqueous solution using anion exchange resins.

Iodine has been used as a disinfectant for many years. It's use as a disinfectant for potable water has been restricted to short term or emergency use due to concerns of excess iodine in the human diet, especially for people with thyroid conditions.

Strong base anion exchange materials have been used for the recovery of iodine from mixed brines as well as in a process to remove both forms of iodine in water treatment processes.

U.S. Pat. No. 3,767,776 uses a quaternary ammonium anion exchange material in an organic solvent, in a liquid/liquid extraction, to remove iodides from strongly alkaline brines.

U.S. Pat. No. 2,157,508 relates to the recovery of iodine and iodide using a metasilicate capable of selectively removing iodide ion from salt solutions. U.S. Pat. No. 5,356,611 comprises a process for recovering iodine from a composition containing elemental iodine. The process requires iodine to be reduced to iodide before sorption on an anion exchange resin.

U.S. Pat. No. 5,366,636 uses a chelating resin to hold silver ions which react with iodide ions in water forming insoluble silver iodide.

U.S. Pat. No. 5,350,523 relates to a process for removing anions in a solution at a high temperature by having the anions adsorbed on an anion exchange resin. The strong base anion resin can operate at a much higher than conventional temperature because of an alkyl link between the quaternary amine group and the benzene ring of the structural resin.

U.S. Pat. No. 2,945,746 relates to a process for recovering iodides from aqueous solutions of salt brine with ion exchange resins. The anionic exchange resins are eluted with an acidified salt solution containing traces of $SO_2$.

U.S. Pat. No. 2,261,021 relates to the sorption of free elemental iodine from aqueous solutions using a resin made by the condensation of metaphenylene diamine and formaldehyde.

U.S. Pat. No. 3,050,369 relates to a process for recovering iodine from aqueous iodide solutions, by contacting an aqueous iodide solution with a trimethyl amine anion exchange resin, such as Dowex® 1, 2, 11 or 21A, in a polyhalide form.

U.S. Pat. No. 3,177,050 describes a fluidized ion exchange bed including an anion exchange resin for recovering iodine from an aqueous solution. The resin employed is a commercial, strongly basic, quaternary ammonium anion exchange resin. A particular resin employed is a trimethyl quaternary ammonium anion exchange resin.

Strong-base anion resins have also been used to separate nitrate from waters containing a significant amount of sulfate ion. In U.S. Pat. No. 4,479,877, for example, nitrate removal is accomplished by passing the water to be treated through a bed of a strong-base anion exchange resin which is a tributyl amine derivative of a copolymer exemplified by styrene-divinyl benzene.

SUMMARY OF THE INVENTION

The present process is designed for removing elemental iodine and iodide ions from an aqueous solution containing iodine and iodide ions. This process comprises providing a strong-base anion exchange resin.

The resin comprises trialkyl amine groups each alkyl group preferably comprising from 3 to 8 carbon atoms, more preferably comprising 3 to 6 carbon atoms, and most preferably comprising 3 to 4 carbon atoms.

The aqueous solution containing elemental iodine and iodide ions is passed through the resin and thereby treats the aqueous solution by removing elemental iodine and iodide ions therefrom. The effectiveness of the anion exchange resin to remove elemental iodine and iodide ion from the feed stream is indicated by measuring its Breakthrough Point. The longer the time period for a feed stream to reach a given level of $I_2$ and $I^-$, the more effective is the anion exchange resin in removing these moieties from the feed stream. For purposes of this invention, Breakthrough Point is defined as the point when the untreated feed stream, which originally contained 2 ppm of elemental iodine and 0.5 ppm of iodide ion in dechlorinated tap water, reaches a total I concentration of 0.02 ppm as measured by the Leuco Crystal Violet Method. The volume of the aqueous solution passing through the resin until reaching the Breakthrough Point is typically at least about 8 liters per cubic centimeter, preferably at least about 10 liters per cubic centimeter, and most preferably at least about 12 liters per cubic centimeter.

In the process of the present invention, the pH of the aqueous solution containing iodine and iodide ions is preferably up to about 7.0, more preferably up to about 8.0, and most preferably up to about 9.0. As for the TDS, i.e., total dissolved solids of the aqueous feed solution, the process of the present invention can effectively remove iodine and iodide ions from aqueous feed solutions having a TDS of preferably up to about 300 ppm, more preferably up to about 400 ppm, and most preferably up to about 500 ppm.

Moreover, the step of treating the aqueous solution by removing elemental iodine and iodide ions therefrom is preferably conducted at a temperature of not more than about 80 degrees F., more preferably at a temperature of not more than about 90 degrees F., and most preferably at a temperature of not more than about 100 degrees F.

The foregoing and other objects, features and advantages of the invention will become more readily apparent from the following detailed description of the invention.

DETAILED DESCRIPTION OF THE INVENTION

A process is provided herein for removing elemental iodine and iodide ions from an aqueous solution containing iodine and iodide ions, and for using a strong-base anion exchange resin for removing same. The strong-base anion exchange resins are typically ion exchange resins which are preferably strongly basic anion exchange resins, and more preferably strongly basic anion, quaternary ammonium exchange resins. In general, most commercial anion exchange resins have a poly(styrene) backbone with divinylbenzene crosslinking units to provide the necessary degree of dimensional stability and water insolubility for the polymer. The functional quaternary ammonium or polyamine groups are attached to the benzyl groups usually by reaction of an intermediate poly (vinylbenzylhalide) resin with an appropriate organic amine or dimethylethanolamine.

The resins utilized according to the present novel process are usually available as uniform granular beads in the chloride form. The preferred bead size is 16 to 200 mesh, more preferably 18 to 100 mesh, and most preferably 20 to 50 mesh. While the chloride form is most commonly available, any form of anion exchange resin may be employed so long as the anionic component is exchangeable by iodide or polyiodide anions. Conversion from one anionic form to another is readily accomplished by well-known ion exchange techniques when necessary.

The present novel process may be carried out in conventional ion exchange equipment adapted for feed at the lower end of the anion exchange resin column. For efficient utilization of the resin, the bed is preferably at least as deep or deeper than it is wide, i.e., the height to width ratio of the column is at least one. Carry-over loss of resin is prevented by using a screen or settling chamber at the top of the resin column.

The backbone resins used as substrates to produce the anion exchange resins employed in the process of the present invention are preferably copolymers of (a) a vinyl aryl compound and (b) a polyolefinic cross-linking agent. The monovinyl aromatic compounds are suitably vinyl aromatic hydrocarbons, such as styrene, orthometa and para methyl and ethyl styrenes, vinyl naphthalene, vinyl anthracene and the homologues of these compounds. Styrene is preferred. Also, the monovinyl aryl moiety of the copolymer may consist of nuclear substituted chlorine or bromine substituted vinyl aryl compounds, such as the ortho, meta and parachloro and bromo styrenes copolymerized with other diluting monovinyl aryl compounds. The preferred polyolefinic cross-linking agents are polyvinyl aromatic compounds, also selected from the benzene and naphthalene series. Examples of polyvinyl aromatic compounds are divinylbenzene, divinyltoluene, divinylxylene, divinylnaphthalene and divinylethylbenzene.

The anion exchange resins employed in the present invention may be formed by first reacting one of the aforementioned copolymers with a halogen in the presences of a halogenating catalyst to produce halomethyl radicals attached to aromatic nuclei in the resin in the manner more fully described in U.S. Pat No. 2,6114,099 to W. C. Bauman et al., and U.S. Pat. No. 3,177,050 to James J. Houy, et al, the teachings of which are incorporated herein by reference.

EXAMPLE 1

The effectiveness of employing a conventional, commercial, strongly basic, quaternary ammonium anion exchange resin to remove iodine and iodide from an aqueous feed stream was experimentally determined.

The reference or current state of the art anion exchange resin employed was a commercial trimethyl amine derivative of a styrene-divinyl benzene copolymer in which the trimethyl amine constituent is pendant from the copolymer ("$C_1$ Resin"). The $C_1$ Resin is a commercial, strongly basic, quaternary ammonium anion exchange resin sold under the trademark SBR®, which is manufactured by Dow Chemical Company.

A feed stream containing approximately 2 ppm of elemental iodine and 0.5 ppm of iodide ion in dechlorinated tap water (TDS=190 ppm @pH=6.3) was passed thru 20 cc beds (23 mm diameter by 50 mm thick) of the $C_1$ Resin at the rate of 50 cc/minute using a peristaltic multihead pump manufactured by Cole Parmer. The iodine and iodide levels in the feed water, as well as in the effluents of the $C_1$ Resin beds, were determined using the Leuco Crystal Violet Method.

The volume of feed stream flowing thru the beds until the Breakthrough Point, as previously defined, was reached using the $C_1$ Resin as the anion exchange material was experimentally determined.

The liters of the above-defined feed stream which were treated per cubic centimeter of $C_1$ Resin before the Breakthrough Point was reached was experimentally determined to be 5 liters/cc.

EXAMPLE 2

The effectiveness of employing other strongly basic, quaternary ammonium anion exchange resins to remove iodine and iodide from the previously described aqueous feed stream was experimentally determined using the procedure described above in Example 1. The results for C-2 thru C-4 and C-8 alkyl amine derivatives, as well as the results for the C-1 Resin of Example 1, are summarized in Table 1 below.

TABLE 1

| Amine Derivative | Liter/cc To Breakthrough Point |
|---|---|
| Methyl ("C-1") | 5 |
| Ethyl ("C-2") | 6 |
| Propyl ("C-3") | 15 |
| Butyl ("C-4") | 25 |
| Octyl ("C-8") | 8 |

The results of these experiments clearly indicate that the propyl and butyl amine derivatives, denoted C-3 and C-4, of the quaternary ammonium anion exchange resin employed herein have an unexpectedly higher selectivity than their C-1, C-2 and C-8 counterparts, i.e., they are 2.5 to 5 times more effective that conventional lower alkyl (C-1 and C-2) amine derivatives and 2 to 3 times more effective than higher alkyl (C-8) amine derivatives, for removing elemental iodine and iodide ions in the aforementioned iodine-containing and iodide-containing aqueous feed solutions.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. A process for removing elemental iodine and iodide ions from an aqueous solution containing iodine and iodide ions, which comprises providing a strong-base anion exchange resin, said resin comprising trialkyl amine groups each having from 3 to 4 carbon atoms;

passing said aqueous solution containing elemental iodine and iodide ions through said resin and thereby treating said aqueous solution by removing elemental iodine and iodide ions therefrom, the volume of the aqueous solution passing through said resin until reaching the Breakthrough Point being at least about 15 liters per cubic centimeter.

2. The process of claim 1, wherein the pH of the aqueous solution containing iodine and iodide ions is up to about 9.0.

3. The process of claim 1, wherein the step of treating said aqueous solution by removing elemental iodine and iodide ions therefrom is conducted at a temperature of not more than about 100 degrees F.

4. The process of claim 1, wherein said resin can effectively remove iodine and iodide ions from aqueous feed solutions having a TDS of up to about 300 ppm.

5. The process of claim 1, wherein the strong-base anion exchange resins comprises an anionic quaternary ammonium exchange resin.

6. The process of claim 1, wherein the bead size of said resin is 16 to 200 mesh.

7. A process for using a strong-base anion exchange resin, which comprises providing said resin comprising trialkyl amine groups having alkyl groups containing from 3 to 4 carbon atoms;

passing an aqueous solution containing elemental iodine and iodide ions through said resin and thereby treating said aqueous solution by removing elemental iodine and iodide ions therefrom, the volume of the aqueous solution passing through said resin until reaching the Breakthrough Point being at least about 15 liters per cubic centimeter.

8. The process of claim 7, wherein the pH of the aqueous solution containing iodine and iodide ions is up to about 9.0.

9. The process of claim 7, wherein the step of treating said aqueous solution by removing elemental iodine and iodide ions therefrom is conducted at a temperature of not more than about 100 degrees F.

10. The process of claim 7, wherein said resin can effectively remove iodine and iodide ions from aqueous feed solutions having a TDS of up to about 300 ppm.

11. The process of claim 7, wherein the strong-base anion exchange resins comprises an anionic quaternary ammonium exchange resin.

12. The process of claim 7, wherein the bead size of said resin is 16 to 200 mesh.

13. A process for using a strong-base anion exchange resin, which comprises providing said resin comprising a copolymer of (a) a vinyl aryl compound and (b) a polyolefinic cross-linking agent, said copolymer having alkyl amine groups which are pendant therefrom, the trialkyl amine groups having alkyl groups containing from 3 to 4 carbon atoms; and passing an aqueous solution containing elemental iodine and iodide ions through said resin and thereby treating said aqueous solution by removing elemental iodine and iodide ions therefrom, the volume of the aqueous solution passing through said resin until reaching the Breakthrough Point being at least about 15 liters per cubic centimeter.

14. The process of claim 13, wherein the pH of the aqueous solution containing iodine and iodide ions is up to about 9.0.

15. The process of claim 13, wherein the step of treating said aqueous solution by removing elemental iodine and iodide ions therefrom is conducted at a temperature of not more than about 100 degrees F.

16. The process of claim 13, wherein said resin can effectively remove iodine and iodide ions from aqueous feed solutions having a TDS of up to about 300 ppm.

17. The process of claim 13, wherein the strong-base anion exchange resins comprises an anionic quaternary ammonium exchange resin.

18. The process of claim 13, wherein the bead size of said resin is 16 to 200 mesh.

\* \* \* \* \*